(12) United States Patent
Han et al.

(10) Patent No.: US 11,008,247 B1
(45) Date of Patent: May 18, 2021

(54) GLASS CERAMIC AND PREPARATION METHOD THEREOF

(71) Applicant: North Minzu University, Yinchuan (CN)

(72) Inventors: Fenglan Han, Yinchuan (CN); Yajuan Liu, Yinchuan (CN)

(73) Assignee: North Minzu University, Yinchuan (CN)

( * ) Notice: Subject to any disclaimer, the term of this patent is extended or adjusted under 35 U.S.C. 154(b) by 0 days.

(21) Appl. No.: 15/929,607

(22) Filed: May 12, 2020

(30) Foreign Application Priority Data

Dec. 24, 2019 (CN) .......................... 201911341939.3

(51) Int. Cl.
| | |
|---|---|
| *C03C 10/00* | (2006.01) |
| *C03B 32/02* | (2006.01) |
| *C03C 1/00* | (2006.01) |
| *C03B 19/02* | (2006.01) |
| *C25C 3/30* | (2006.01) |

(52) U.S. Cl.
CPC .......... *C03C 10/0045* (2013.01); *C03B 19/02* (2013.01); *C03B 32/02* (2013.01); *C03C 1/002* (2013.01); *C03C 2204/00* (2013.01); *C25C 3/30* (2013.01)

(58) Field of Classification Search
CPC .......... C03C 10/0045; C03C 2204/00; C03C 1/002; C03B 19/02; C03B 32/02; C25C 3/30
See application file for complete search history.

(56) References Cited

U.S. PATENT DOCUMENTS

| | | | |
|---|---|---|---|
| 2007/0197371 A1* | 8/2007 | Wei ......................... | C03C 3/064 501/136 |
| 2008/0017077 A1* | 1/2008 | Abbate .................. | C04B 28/02 106/679 |

FOREIGN PATENT DOCUMENTS

| | | | |
|---|---|---|---|
| CN | 101648774 | * | 2/2010 |
| CN | 106477883 | * | 3/2017 |

OTHER PUBLICATIONS

Jiang, Limin. "Heat treatment parameters of preparing glass-ceramic with electrolytic manganese residue and their properties." Journal of Thermal Analysis and Calorimetry 140.4 (2019): 1737-1744. (Year: 2019).*

(Continued)

*Primary Examiner* — Karl E Group
*Assistant Examiner* — Cameron K Miller
(74) *Attorney, Agent, or Firm* — Smith & Hopen, P.A.; Paul Murty

(57) ABSTRACT

A glass ceramic and a preparation method thereof include a step of melting calcined electrolytic manganese slag to obtain molten glass. The molten glass is sequentially molded, nucleated, and crystallized to obtain the glass ceramic. The calcined electrolytic manganese slag is taken as a raw material, so that harmful gases are not generated in the raw material melting process, and secondary pollution is not caused. The preparation method provided by the present invention has the advantages of simple operation, high utilization rate of electrolytic manganese slag and low cost. Moreover, the prepared glass ceramic has good mechanical properties and corrosion resistance.

9 Claims, 5 Drawing Sheets

(56) References Cited

OTHER PUBLICATIONS

Qian, Jueshi, et al. "Crystallization characteristic of glass-ceramic made from electrolytic manganese residue." Journal of Wuhan University of Technology-Mater. Sci. Ed. 27.1 (2012): 45-49. (Year: 2012).*
CN101648774—machine translation via EspaceNet (Year: 2010).*
CN106477883—machine translation via EspaceNet (Year: 2017).*

* cited by examiner

GLASS CERAMIC AND PREPARATION METHOD THEREOF

CROSS-REFERENCE TO RELATED APPLICATIONS

This nonprovisional application is a continuation of and claims priority to international patent application No. CN 201911341939.3, entitled "Glass ceramic and preparation method thereof," filed Dec. 24, 2019 by the same inventors.

BACKGROUND OF THE INVENTION

1. Field of the Invention

This invention relates, generally, to resource utilization of industrial solid waste. More specifically, it relates to a glass ceramic and a preparation method thereof.

2. Brief Description of the Prior Art

China is the world's largest producer, consumer and exporter of manganese metal. In 2018, the annual production of electrolytic manganese metal accounted for 97% of the world's total electrolytic manganese metal production. For every ton of manganese produced, 8-10 tons of manganese slag is produced, with an annual increase of more than 10 million tons of manganese slag. The content of manganese in manganese slag usually exceeds 2%. Generally, manganese slag is piled up, which not only occupies land, but also causes harmful metal ions to infiltrate into the soil under the leaching of rainwater, thus causing pollution to the soil and groundwater, damaging the environment and causing potential harm to people's health. Therefore, it is urgent to solve the problem of accumulation of manganese slag and potential environmental and safety problems caused by manganese slag.

Common manganese slag treatment methods include recovering manganese from electrolytic manganese slag and using the manganese slag as a fertilizer, a cement retarder, and a paving material. The cost of recovering manganese from electrolytic manganese slag is high, and it easily causes secondary pollution to the environment. When manganese slag is used as a fertilizer, harmful elements therein pollute the soil and endanger people's health. When manganese slag is used as a cement retarder, the dosage is generally not greater than 5%, and the utilization rate is low. When manganese slag is used as a paving material, harmful metals therein penetrate underground after rainwater leaching, polluting the soil and groundwater resources and damaging the environment and people's health. Therefore, the foregoing manganese slag treatment methods still cannot effectively solve the problem of accumulation of a large amount of electrolytic manganese slag.

At present, some researchers have also explored and studied the preparation of glass ceramics from manganese slag. However, in the existing preparation methods, the doping amount of manganese slag is small, and many kinds of additives need to be added.

Accordingly, what is needed is an effective and efficient method of utilizing manganese slag in glass ceramic preparations. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a glass ceramic and a preparation method thereof is now met by a new, useful, and nonobvious invention.

The novel method includes a step of melting calcined electrolytic manganese slag to obtain molten glass. The molten glass is sequentially molded, nucleated, and crystallized to obtain a glass ceramic. The molding step is selected from the group consisting of compression molding and cast molding.

In an embodiment using compression molding, before molding the molten glass, the method includes steps of sequentially subjecting the molten glass to a water quenching step, a drying step, and a crushing step to obtain a glass power, and a step of mixing the obtained glass powder with a binder. The molten glass is subjected to a pressure of between 20 MPa and 35 MPa for a time of between 0.5 minutes and 3 minutes.

In an embodiment using cast molding, before melting the calcined electrolytic manganese slag, the method includes a step mixing the calcined electrolytic manganese slag with a nucleating agent. The nucleating agent includes at least one of chromic oxide, titanium dioxide, and potassium dichromate, and the nucleating agent is between 1 wt. % and 5 wt. % of a total weight of the combined calcined electrolytic manganese slag and the nucleating agent. After the step of cast molding, the method further inclues a step of annealing the combined calcined electrolytic manganese slag and the nucleating agent.

In an embodiment, a melting temperature of the step of melting calcined electrolytic manganese slag is between 1300° C. and 1450° C. and a melting time is between 60 minutes and 150 minutes; the nucleation temperature of the step of nucleating the molten glass is between 770° C. and 850° C. and a nucleation time is between 30 minutes 90 minutes; and a crystallization temperature is between 920° C. and 1050° C. and a crystallization time is between 60 minutes and 180 minutes.

An embodiment of the calcined electrolytic manganese slag includes between 46% and 53% mass percent of $SiO_2$ (silicon dioxide), between 16.5 and 20% mass percent of CaO (calcium oxide), between 7.5 and 12% mass percent of $Al_2O_3$ (aluminum oxide), between 4 and 6% mass percent of $Fe_2O_3$ (iron(III) oxide), between 3.9 and 5.5% mass percent of MgO (magnesium oxide), between 1.6 and 2.2% mass percent of $Na_2O$ (sodium oxide), between 1.5 and 2.3% mass percent of $K_2O$ (potassium oxide), and between 2.5 and 3.5% mass percent of Mn (manganese).

An object of the invention is to effectively utilize manganese slag in a useful and nonharmful application by treating the manganese slag for use as a glass ceramic, and methods of preparing the same.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes provides a method for preparing a glass ceramic. The method includes the steps of melting calcined electrolytic manganese slag to obtain molten glass, and sequentially molding, nucleating and crystallizing the molten glass to obtain the glass ceramic. In the present invention, all raw material components are commercially available products well known to those skilled in the art unless otherwise specified. These steps will be discussed in greater detail herein below.

Figure 1:
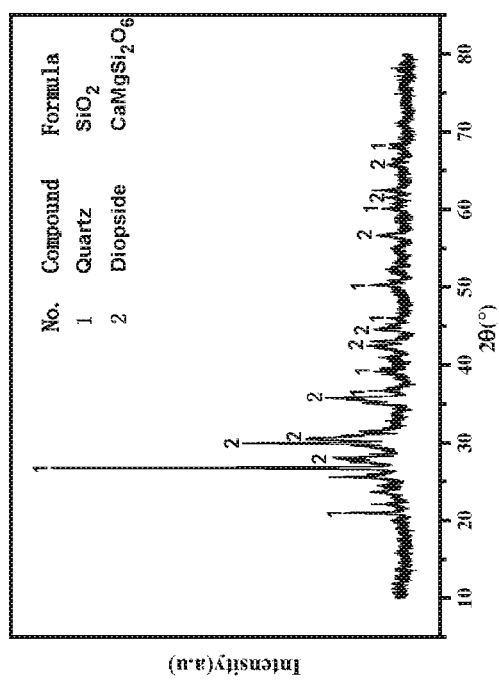
FIG. 1 is an x-ray diffraction (XRD) diagram of calcined electrolytic manganese slag.

In the present invention, the calcined electrolytic manganese slag preferably includes the following components by mass percent: 46-53% of silicon dioxide ($SiO_2$), 16.5-20% of calcium oxide (CaO), 7.5-12% of aluminum oxide ($Al_2O_3$), 4-6% of iron(III) oxide ($Fe_2O_3$), 3.9-5.5% of magnesium oxide (MgO), 1.6-2.2% of sodium oxide ($Na_2O$), 1.5-2.3% of potassium oxide ($K_2O$), 2.5-3.5% of manganese (Mn), and the balance impurities. Main phase compositions of the calcined electrolytic manganese slag are quartz and diopside are shown in the XRD diagram of FIG. 1.

In the process of producing manganese, sulfuric acid is typically required to dissolve manganese in manganese ore to obtain electrolyte-containing manganese ions. The electrolytic process makes manganese ions undergo reduction reaction to obtain metal manganese. Therefore, the uncalcined electrolytic manganese slag contains a large amount of calcium sulfate and magnesium sulfate precipitation. Sulfur in the electrolytic manganese slag can be removed by calcining the electrolytic manganese slag, and $SiO_2$, CaO, $Al_2O_3$, and MgO in the calcined electrolytic manganese slag are the main components of a silicate glass ceramic. In the present method, the calcined electrolytic manganese slag is used as a raw material, so that harmful gases such as $SO_2$ and $SO_3$ can be prevented from being generated in the raw material melting process, and secondary pollution is not caused. In the specific embodiments of the present invention, the calcined electrolytic manganese slag is preferably from Ningxia Tianyuan Manganese Industry Group Co., Ltd.

In the present invention, a melting temperature is preferably 1300-1450° C., more preferably 1320° C., 1350° C., 1360° C., 1400° C., 1420° C., or 1450° C. In addition, the melting time is preferably 60-150 minutes (min), more preferably 60 min, 80 min, 90 min, 100 min, 120 min, 140 min, or 150 min. The temperature is preferably raised to the melting temperature by programmed heating. The programmed heating conditions are preferably that the temperature is raised to 800° C. at a heating rate of 10° C./min, and then raised to the selected melting temperature at a heating rate of 5° C./min. In the present invention, in the melting process, a series of physical and chemical reactions occur between metal oxides in the calcined electrolytic manganese slag to generate molten glass with low viscosity and good fluidity.

As noted above, the melted calcined electrolytic manganese slag is molded. The molding process preferably includes compression molding or cast molding. Each of these methods is described herein below.

Compression Molding

When the compression molding is adopted, before the compression molding, the preparation method preferably further includes sequentially subjecting the molten glass to water quenching, drying and crushing, and mixing obtained glass powder with a binder.

The water used for the water quenching is preferably tap water, and the temperature of the water is preferably 10-25° C. In the present invention, in the water quenching process, the molten glass is rapidly cooled so that crystals cannot be separated out in time, such that an amorphous substance, namely glass, is obtained. In addition, the drying temperature is preferably 90-110° C., more preferably 100-105° C.; and the drying time is preferably 20-60 min, more preferably 30-40 min.

In the present invention, a crushing method is preferably a grinding step; however, the specific grinding operation is not particularly limited, as long as it can be ensured that the particle size of the obtained glass powder meets the requirements. The particle size of the glass powder is preferably 200-300 mesh, more preferably 240-300 mesh.

The binder is preferably a polyvinyl alcohol solution, and the weight of the polyvinyl alcohol solution accounts for 3-6% (preferably 5%) of the total weight of the polyvinyl alcohol solution and the glass powder. In the present invention, a concentration of the polyvinyl alcohol solution is preferably 0.1 g/mL. Adding the binder with the foregoing proportion can effectively improve the formability of the glass powder. The method of mixing the glass powder with the binder is not particularly limited in the present invention, and a mixing method well known in the art may be used.

The compression molding pressure is preferably 20-35 megapascal (MPa), more preferably 20-30 MPa; and the compression molding time is preferably 0.5-3 min, more preferably 0.5-2 min. In the present invention, the compression molding is preferably dry pressing, and the dry pressing is preferably performed on a dry press.

Using compression molding in the molding process, the calcined electrolytic manganese slag is first melted to obtain molten glass, and then the molten glass is sequentially subjected to water quenching, drying and crushing. The obtained glass powder is mixed with a binder for compression molding, and subsequent nucleation and crystallization reactions are performed to obtain the glass ceramic. According to the present invention, the calcined electrolytic manganese slag is taken as a raw material, so that harmful gases such as $SO_2$ and $SO_3$ are prevented from being generated in the raw material melting process, and secondary pollution is not caused. The present invention adopts the foregoing sintering method to prepare the glass ceramic and has simple operation and high utilization rate of electrolytic manganese slag. Moreover, the prepared glass ceramic has good mechanical properties and corrosion resistance.

Cast Molding

Alternatively, using cast molding in the molding process, before the melting, the preparation method further includes mixing the calcined electrolytic manganese slag with a nucleating agent. In the present invention, the nucleating agent preferably includes one or more of chromic oxide, titanium dioxide and potassium dichromate. In the present invention, the weight of the nucleating agent is preferably 1-5% of the total weight of the calcined electrolytic manganese slag and the nucleating agent, more preferably 1.5-5%, and most preferably 3-5%. The cast molding method results in a pouring of the molten glass into a preheated dye, with the temperature of the preheated dye being preferably 600° C. After the cast molding, the cast molding, the method preferably further includes annealing. In the present invention, the annealing temperature is preferably 600° C. and the thermal insulation time is preferably 1-2 hours. The present invention eliminates internal stress by annealing.

In the present invention, when the cast molding is adopted, the calcined electrolytic manganese slag is first mixed with a nucleating agent and then the mixture is molten to obtain molten glass, and then the molten glass is subjected to cast molding. The obtained crude glass product is annealed and finally subjected to subsequent nucleation and crystallization to obtain the glass ceramic. According to the present invention, the calcined electrolytic manganese slag is used as a raw material, so that harmful gases such as $SO_2$ and $SO_3$ are prevented from being generated in the raw material melting process, and secondary pollution is not caused. Similar to the compression molding methods described above, the present invention adopts the foregoing melting method to prepare the glass ceramic and has simple operation and high utilization rate of electrolytic manganese slag. Moreover, the prepared glass ceramic has good mechanical properties and corrosion resistance.

In the present invention, a nucleation temperature is preferably 770-850° C., more preferably 790° C., 800° C., 810° C., 820° C., 830° C., 840° C., or 850° C. The heating rate at which the temperature rises to the nucleation temperature is preferably 5° C./min. Starting from the temperature rising to the nucleation temperature, the nucleation time is preferably 30-60 min. In the present invention, a large number of crystal nuclei are precipitated in a glass matrix during the nucleation process.

In addition, the crystallization temperature is preferably 920-1050° C., more preferably 920° C., 930° C., 950° C., 1030° C., 1040° C., or 1050° C. The heating rate at which the temperature rises to the crystallization temperature is preferably 3° C./min. Starting from the temperature rising to the crystallization temperature, the crystallization time is preferably 60-180 min, more preferably 60-120 min. In the present invention, in the crystallization process, the crystal nuclei form stable crystal phases.

The technical solution in the present invention is clearly and completely described below in conjunction with the embodiments of the present invention. The described embodiments represent some rather than all of the embodiments of the present invention. All other embodiments obtained by a person of ordinary skill in the art based on the embodiments of the present invention without creative efforts shall fall within the protection scope of the present invention.

Embodiment 1

Calcined electrolytic manganese slag was placed in a corundum crucible, and the crucible was placed in a box-type resistance furnace; the temperature was increased to 800° C. at a heating rate of 10° C./min and then increased to 1320° C. at a heating rate of 5° C./min. The temperature was then maintained for 90 min to obtain molten glass, where the calcined electrolytic manganese slag included the following components by mass percent: 51.28% of $SiO_2$, 18.87% of CaO, 10.74% of $Al_2O_3$, 3.57% of $Fe_2O_3$, 3.94% of MgO, 1.72% of $Na_2O$, 1.50% of $K_2O$, 2.57% of Mn, and 5% of the balance impurities. The particle size was 200-260 mesh.

Figure 2:
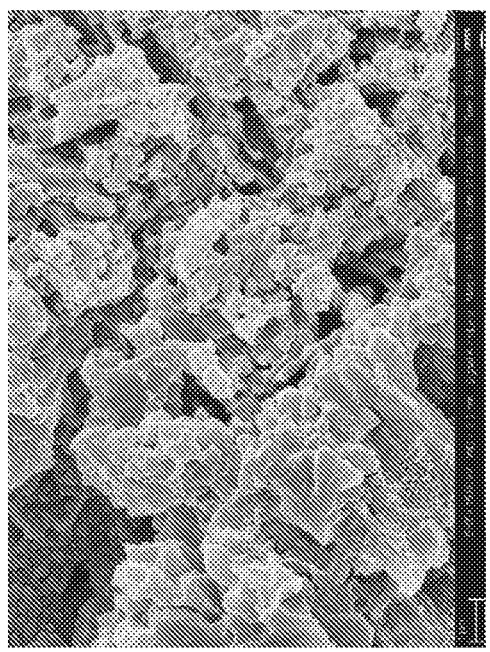
FIG. 2 is a scanning electron microscope (SEM) image of an embodiment of a glass ceramic, referred to herein as Embodiment 1.
Figure 3:
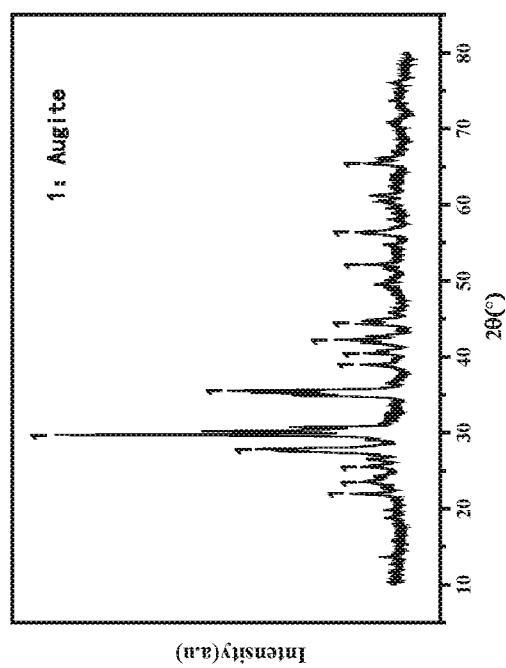
FIG. 3 is an XRD diagram of an embodiment of a glass ceramic, referred to herein as Embodiment 1.

The molten glass was poured into tap water of 20° C., and the obtained glass was dried at 100° C. for 25 min and then ground in a vibration mill to obtain glass powder with a particle size less than or equal to 240 mesh. The glass powder and a polyvinyl alcohol solution (with a concentration of 0.1 g/mL) were evenly mixed at a weight ratio of 95:5, and the mixture was placed on a dry press for dry pressing at a pressure of 20 MPa to obtain a green body. The green body was placed in a box-type resistance furnace, heated to 800° C. at a heating rate of 5° C./min, the temperature was maintained for 30 min for nucleation, the temperate was then raised to 1050° C. at a heating rate of 3° C./min and then maintained for 60 min for crystallization, and then cooled with the furnace to obtain a glass ceramic. An SEM image of the glass ceramic prepared in this embodiment is as shown in FIG. 2, and an XRD diagram thereof is as shown in FIG. 3.

Embodiment 2

Calcined electrolytic manganese slag was evenly mixed with potassium dichromate at a weight ratio of 97:3, the mixture was placed in a corundum crucible. The crucible was placed in a box-type resistance furnace. The temperature was increased to 800° C. at a heating rate of 10° C./min and then increased to 1360° C. at a heating rate of 5° C./min, and then the temperature was maintained for 120 min to obtain molten glass, where the calcined electrolytic manganese slag included the following components by mass percent: 51.28% of $SiO_2$, 18.87% of CaO, 10.74% of $Al_2O_3$, 3.57% of $Fe_2O_3$, 3.94% of MgO, 1.72% of $Na_2O$, 1.50% of $K_2O$, 2.57% of Mn, and 5% of the balance impurities. The particle size was 200-260 mesh.

Figure 4:
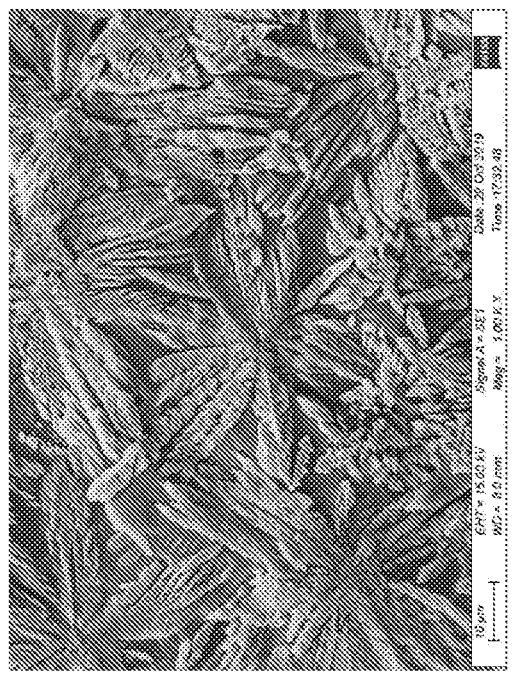
FIG. 4 is an SEM image of an embodiment of a glass ceramic, referred to herein as Embodiment 2.
Figure 5:
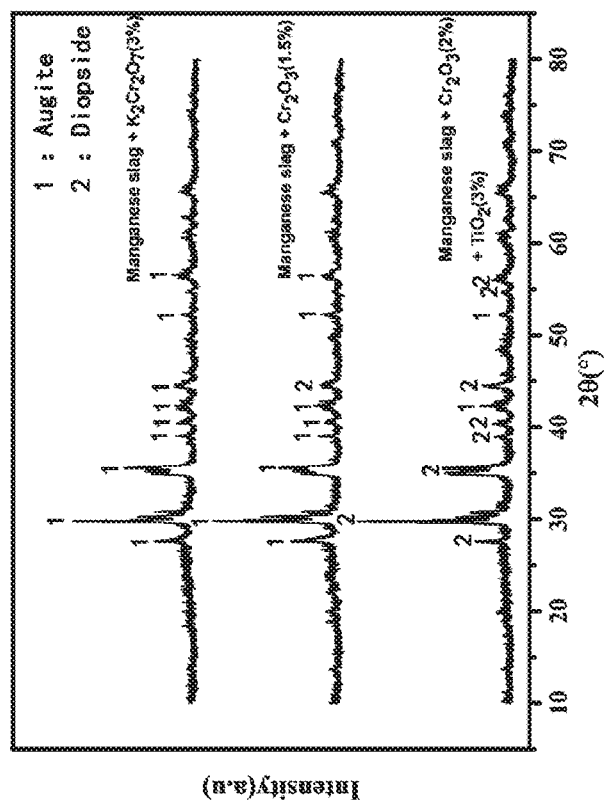
FIG. 5 is an XRD diagram of a glass ceramic prepared in accordance with Embodiments 2, 3, and 4, where manganese slag+potassium dichromate ($K_2Cr_2O_7$) (3%) is shown in Embodiment 2, manganese slag+chromic oxide ($Cr_2O_3$) (1.5%) is shown in Embodiment 3, and manganese slag+$Cr_2O_3$ (2%)+titanium dioxide ($TiO_2$) (3%) is shown in Embodiment 4.

The molten glass was poured into a preheated die of 600° C., and the temperature was maintained at 600° C. for 60 min, and subsequently cooled with the furnace. The obtained glass was placed in the box-type resistance furnace, heated to 820° C. at a heating rate of 5° C./min, and then the temperature was maintained for 60 min. Next, the temperature was raised to 930° C. at a heating rate of 3° C./min and then maintained for 120 min, and subsequently cooled with the furnace to obtain a glass ceramic. An SEM image of the glass ceramic prepared in this embodiment is as shown in FIG. 4, and an XRD diagram thereof is as shown in FIG. 5

Embodiment 3

Calcined electrolytic manganese slag was evenly mixed with chromic oxide at a weight ratio of 98.5:1.5. The mixture was placed in a corundum crucible, and the crucible was placed in a box-type resistance furnace. The temperature was increased to 800° C. at a heating rate of 10° C./min and then increased to 1360° C. at a heating rate of 5° C./min. The temperature was then maintained for 120 min to obtain molten glass, where the calcined electrolytic manganese slag included the following components by mass percent: 51.28% of $SiO_2$, 18.87% of CaO, 10.74% of $Al_2O_3$, 3.57% of $Fe_2O_3$, 3.94% of MgO, 1.72% of $Na_2O$, 1.50% of $K_2O$, 2.57% of Mn, and 5% of the balance impurities. The particle size was 200-260 mesh.

The molten glass was poured into a preheated die of 600° C.; the temperature was maintained at 600° C. for 60 min, and subsequently cooled with the furnace. The obtained glass was placed in the box-type resistance furnace, heated to 820° C. at a heating rate of 5° C./min, and then the temperature was maintained for 60 min. Next, the temperature was raised to 930° C. at a heating rate of 3° C./min and subsequently maintained for 120 min. Finally, the temperature was lowered in the furnace to obtain a glass ceramic. An XRD diagram of the glass ceramic prepared in this embodiment is as shown in FIG. 5.

Embodiment 4

Calcined electrolytic manganese slag, titanium dioxide, and chromic oxide were evenly at a weight ratio of 95:3:2. The mixture was placed in a corundum crucible, and the crucible was placed in a box-type resistance furnace. The temperature was increased to 800° C. at a heating rate of 10° C./min and then increased to 1360° C. at a heating rate of 5° C./min. The temperature was then maintained for 120 min to obtain molten glass, where the calcined electrolytic manganese slag included the following components by mass percent: 51.28% of $SiO_2$, 18.87% of CaO, 10.74% of $Al_2O_3$, 3.57% of $Fe_2O_3$, 3.94% of MgO, 1.72% of $Na_2O$, 1.50% of $K_2O$, 2.57% of Mn, and 5% of the balance impurities. The particle size was 200-260 mesh.

The molten glass was poured into a preheated die of 600° C., kept at 600° C. for 60 min, and then cooled with the furnace. The obtained glass was placed in the box-type resistance furnace, heated to 820° C. at a heating rate of 5° C./min, and then maintained at the temperature for 60 min. Next, the glass was heated to 930° C. at a heating rate of 3° C./min, maintained at the temperature for 120 min, and finally cooled with the furnace to obtain a glass ceramic. An XRD diagram of the glass ceramic prepared in this embodiment is as shown in FIG. 5.

Example 1

The bulk density, water absorption, bending strength, and acid and alkali resistance of the glass ceramic prepared in Embodiments 1-4 were tested respectively. The bulk density and water absorption were tested according to GB/T 9966-2001 "Test Methods for Natural facing stones." The bending strength was tested according to a three-point bending method, and the acid and alkali resistance was tested according to JC/T 258-93 "Acid and Alkali Resistance Test of Method for Testing Properties of Cast Stone Products," with test results shown in Table 1 below. As can be seen from FIGS. 3 and 5, the main crystal phase of the glass ceramic samples prepared in Embodiments 1-3 is the augite phase, and the main crystal phase of the glass ceramic prepared in Embodiment 4 is the diopside phase. Both augite and diopside belong to the pyroxene crystal phase.

TABLE 1

Properties of glass ceramics prepared in Embodiments 1-4

| Embodiment | Preparation Method | Bulk Density (g·cm$^{-3}$) | Water Absorption (%) | Bending Strength (MPa) | Acid Resistance (%) | Alkali Resistance (%) |
| --- | --- | --- | --- | --- | --- | --- |
| 1 | Sintering | 2.82 | 0.05 | 125.05 | 98.89 | 99.24 |
| 2 | Melting | 2.99 | 0.02 | 154.88 | 99.58 | 99.59 |
| 3 | Melting | 2.99 | 0.02 | 136.87 | 99.60 | 99.50 |
| 4 | Melting | 3.01 | 0.01 | 153.89 | 99.69 | 99.48 |

As can be seen from Table 1, as shown in test results of the embodiments, the bulk density of the prepared glass ceramic was 2.82-3.01 g·cm$^{-3}$, the water absorption was 0.01-0.05%, the bending strength was 125.05-154.88 MPa, the acid resistance was 98.89-99.69%, and the alkali resistance was 99.24-99.59%, indicating that the glass ceramic provided by the present invention has excellent mechanical properties and corrosion resistance.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of preparing a glass ceramic, the method comprising the steps of:
   melting calcined electrolytic manganese slag to obtain molten glass; and
   sequentially molding, nucleating, and crystallizing the molten glass to obtain a glass ceramic,
   wherein the calcined electrolytic manganese slag comprises: between 46% and 53% mass percent of silicon dioxide ($SiO_2$), between 16.5 and 20% mass percent of calcium oxide (CaO), between 7.5 and 12% mass percent of aluminum oxide ($Al_2O_3$), between 4 and 6% mass percent of iron(III) oxide ($Fe_2O_3$), between 3.9 and 5.5% mass percent of magnesium oxide (MgO), between 1.6 and 2.2% mass percent of sodium oxide ($Na_2O$), between 1.5 and 2.3% mass percent of potassium oxide ($K_2O$), and between 2.5 and 3.5% mass percent of manganese (Mn).

2. The method of claim 1, wherein the molding step comprises a process selected from the group consisting of compression molding and cast molding.

3. The method of claim 2, wherein the molding step is compression molding, further comprising a step of, before molding the molten glass, sequentially subjecting the molten glass to a water quenching step, a drying step, and a crushing step to obtain a glass power, and a step of mixing the obtained glass powder with a binder.

4. The method of claim 3, wherein during the step of compression molding, the molten glass is subjected to a pressure of between 20 MPa and 35 MPa for a time of between 0.5 minutes and 3 minutes.

5. The method of claim 2, wherein the molding step is cast molding, further comprising a step of, before melting the calcined electrolytic manganese slag, mixing the calcined electrolytic manganese slag with a nucleating agent.

6. The method of claim 5, wherein the nucleating agent comprises at least one of chromic oxide, titanium dioxide, and potassium dichromate, and wherein the nucleating agent is between 1 wt. % and 5 wt. % of a total weight of the combined calcined electrolytic manganese slag and the nucleating agent.

7. The method of claim 5, wherein after the step of cast molding, the method further comprises a step of annealing the combined calcined electrolytic manganese slag and the nucleating agent.

8. The method of claim 1, wherein:
   a melting temperature of the step of melting calcined electrolytic manganese slag is between 1300° C. and 1450° C. and a melting time is between 60 minutes and 150 minutes;
   a nucleation temperature of the step of nucleating the molten glass is between 770° C. and 850° C. and a nucleation time is between 30 minutes 90 minutes; and
   a crystallization temperature is between 920° C. and 1050° C. and a crystallization time is between 60 minutes and 180 minutes.

9. A glass ceramic comprising:
   calcined electrolytic manganese slag comprising: between 46% and 53% mass percent of silicon dioxide ($SiO_2$), between 16.5 and 20% mass percent of calcium oxide (CaO), between 7.5 and 12% mass percent of aluminum oxide ($Al_2O_3$), between 4 and 6% mass percent of iron(III) oxide ($Fe_2O_3$), between 3.9 and 5.5% mass percent of magnesium oxide (MgO), between 1.6 and 2.2% mass percent of sodium oxide ($Na_2O$), between 1.5 and 2.3% mass percent of potassium oxide ($K_2O$), and between 2.5 and 3.5% mass percent of manganese (Mn),
   wherein the calcined electrolytic manganese slag is melted, molded, nucleated, and crystallized to form a glass ceramic.

* * * * *